April 13, 1943.  N. S. SELLS  2,316,368
VEGETABLE PEELING MACHINE
Filed Aug. 8, 1939  3 Sheets-Sheet 3
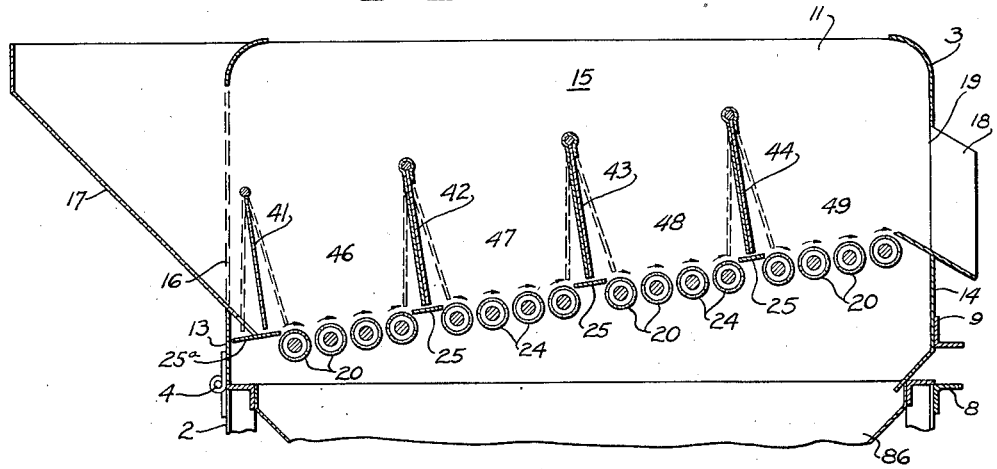
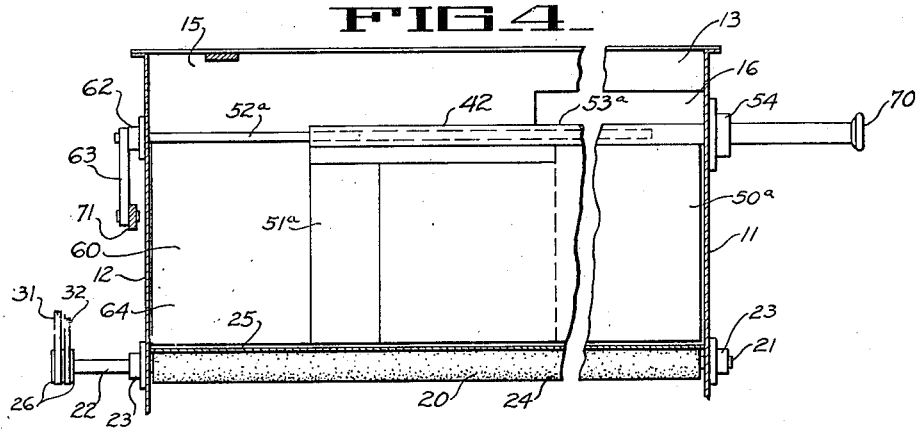
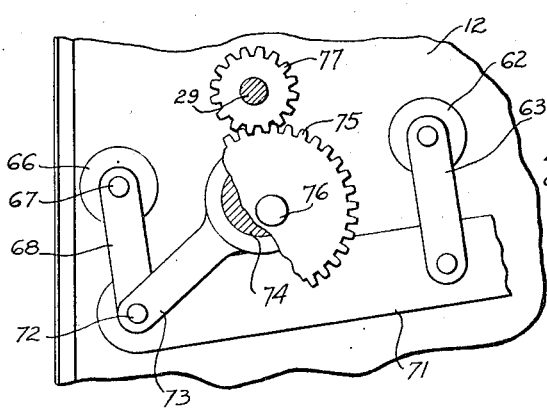
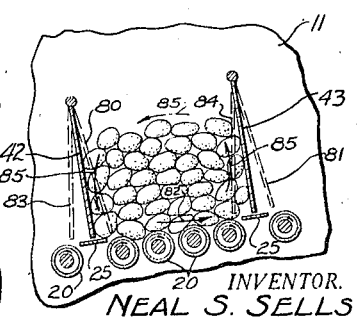
INVENTOR.
NEAL S. SELLS
BY Philip A. Minnis
ATTORNEYS.

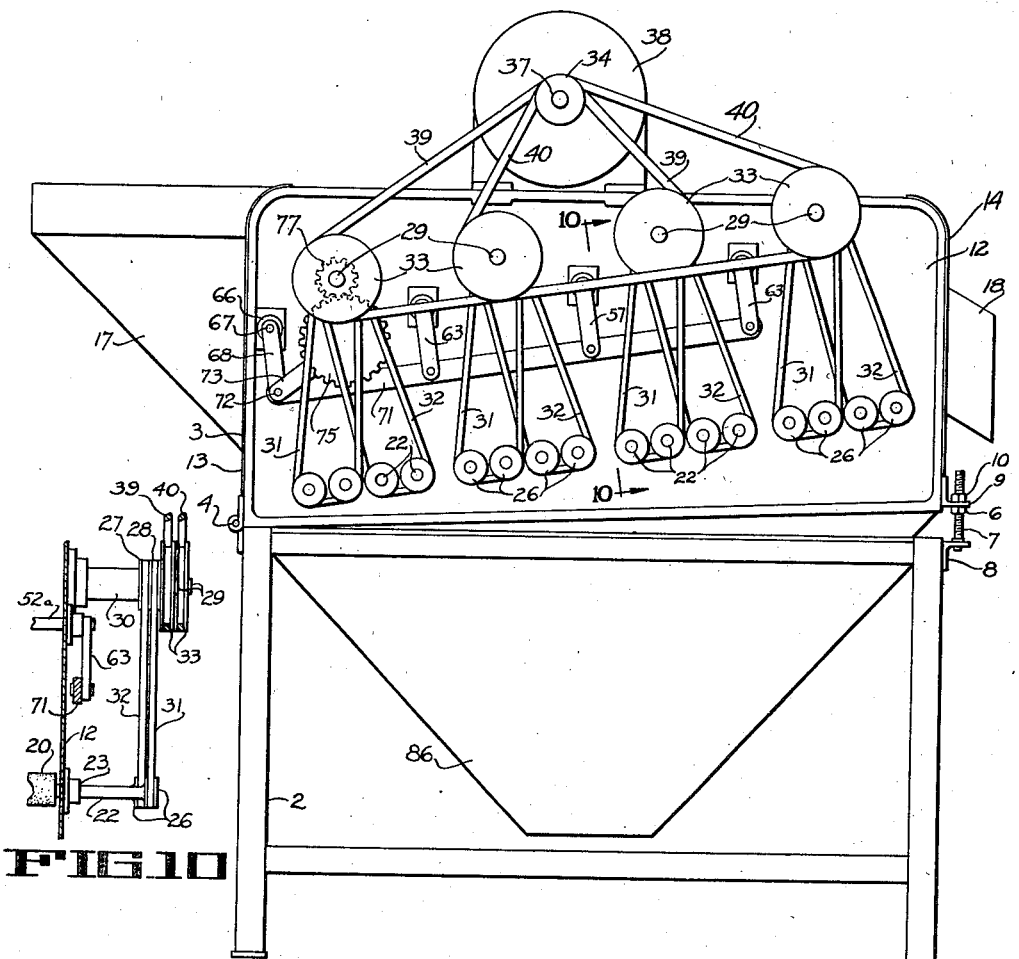

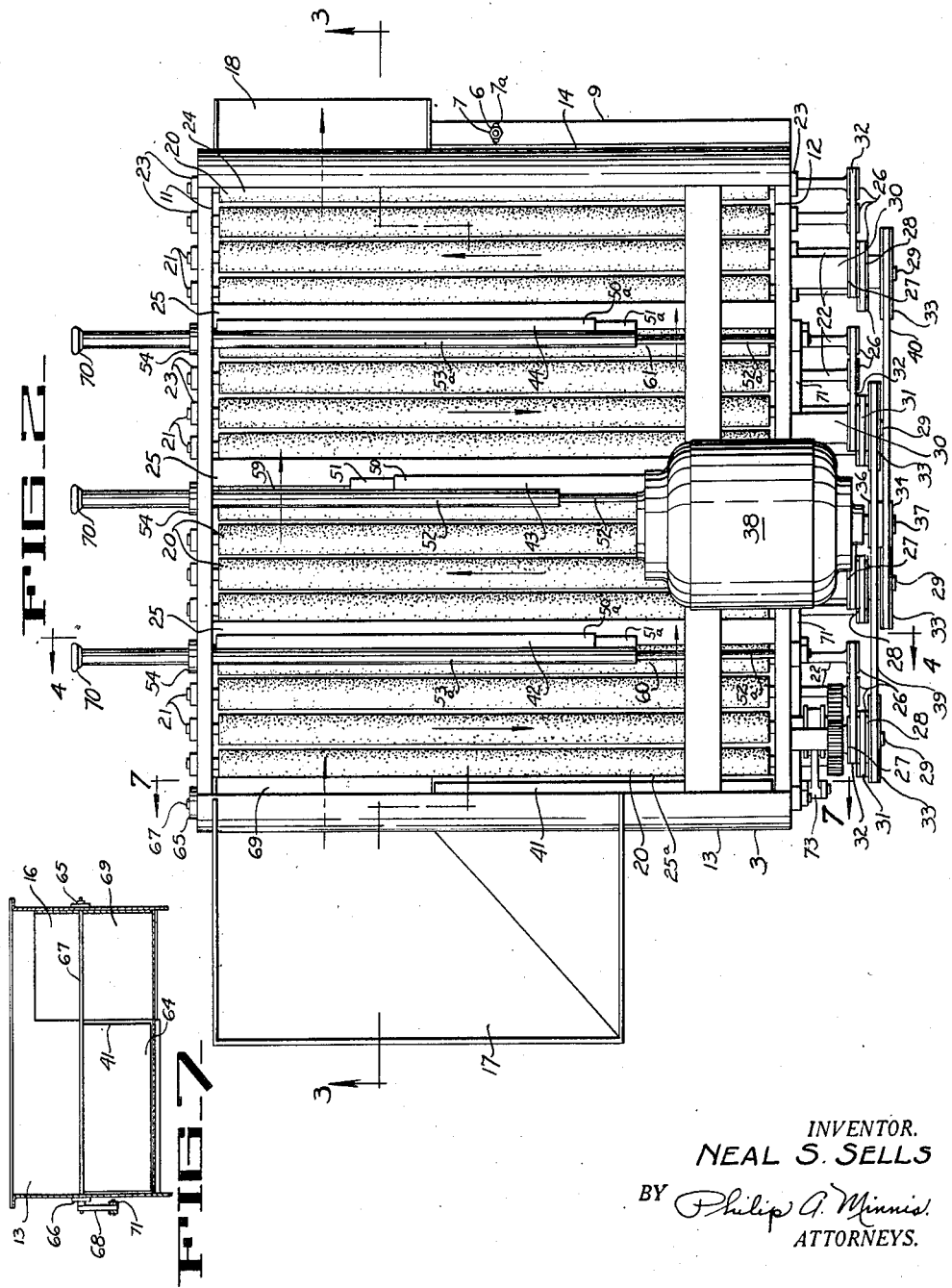

Patented Apr. 13, 1943

2,316,368

UNITED STATES PATENT OFFICE 2,316,368

VEGETABLE PEELING MACHINE

Neal S. Sells, Hoopeston, Ill., assignor to Food Machinery Corporation, San Jose, Calif., a corporation of Delaware Application August 8, 1939, Serial No. 288,966

16 Claims. (Cl. 146—49)

The present invention appertains to a vegetable peeling machine of the type wherein rotatable elements provided with an abrasive surface perform peeling operations upon vegetables continuously advanced through the machine.

Machines of this nature employed heretofore are of a rather complicated construction and require frequent attention, so that their costs of maintenance are very high.

It is therefore the object of the present invention to provide a vegetable peeling machine of the continuous type above referred to which is of a simple construction and inexpensive in its upkeep and operation.

Another object of the present invention is to provide a machine for peeling vegetables in a continuous manner, and for rotating the mass of vegetables during its travel through the machine for presenting the individual components thereof to the action of the peeling elements.

Another object of the present invention is to provide a peeling machine for rotating the individual components of a mass of vegetables passing through the machine for presenting all portions of their surface to the action of the peeling elements for removing the skin or epidermis thereof.

Another object of the present invention is to provide a peeling machine including means for preventing excessive peeling of the vegetables treated thereby and for promoting the advancement of the same through the machine.

Another object of the present invention is to provide a peeling machine which includes means for regulating the treating period of vegetables therein and for controlling their advancement therethrough in an effective manner.

Other and further objects and advantages of the present invention will become apparent from the following description and drawings, in which:

Fig. 1 is a side elevation of the machine of the present invention.

Fig. 2 is a plan view thereof.

Fig. 3 illustrates a longitudinal section taken along the lines 3—3 of Fig. 2, certain parts being broken away.

Fig. 4 is a transverse section of the machine of the present invention taken along lines 4—4 of Fig. 2, certain parts being omitted.

Fig. 5 is a perspective view of a partition member employed in the present invention, certain portions thereof being broken away.

Fig. 6 is a sectional view of Fig. 5 taken along the lines 6—6 thereof.

Fig. 7 is a reduced transverse section of a portion of Fig. 2 taken along lines 7—7 thereof.

Fig. 8 is a detail view of the operating mechanism for the movable partitions employed in the construction of the present invention, certain parts being broken away.

Fig. 9 is a section of a portion of the machine as shown in Fig. 3, illustrating the operation of the peeling elements and movable partitions in a somewhat diagrammatic manner.

Fig. 10 is a reduced section of a portion of Fig. 1 taken in the direction of lines 10—10 thereof, showing the arrangement of the various pulleys of the machine with respect to each other.

Referring now to the drawings and primarily to Fig. 1, 2 indicates the lower frame structure of the vegetable peeling machine which carries an upper frame structure 3 hinged thereto as shown at 4 for permitting tilting of the upper frame structure of the machine with respect to the lower frame structure 2 thereof. The amount of tilt of the upper frame structure is regulated by means of an adjustment nut 6 of a screw rod 7 supported by a bracket 8 secured to the frame 2 of the machine. The screw rod 7 extends through an elongated opening 7a in a bracket 9 attached to the upper frame structure 3. The bracket 9 and the upper frame structure 3 are supported by the adjustable nut 6 while a lock nut 10 is adapted to secure the parts referred to in predetermined positions of adjustment.

The upper frame structure comprises side walls 11 and 12 and end walls 13 and 14 forming a treating compartment 15. Attached to the end wall 13 adjacent an opening 16 is a feed hopper 17, while the end wall 14 is provided with a discharge chute 18 positioned adjacent a discharge opening 19 in the end wall 14. Mounted between the side walls 11 and 12 are a plurality of transversely extending peeling rolls 20 provided with stud shafts 21 and 22 rotatably received within bearings 23 secured to the side walls 11 and 12 of the machine.

The rotatable peeling elements 20 are provided with abrasive surfaces 24 and are arranged in groups of four, spaced with respect to each other by means of spacer members 25 and 25a extending transversely of the machine. The spacer members 25 are attached to the side walls 11 and 12 of the machine, while the spacer member 25a is secured to the side wall 12 and end wall 13 thereof. The peeling elements 20 are positioned in such a manner within the upper frame structure of the machine as to form an inclined treating bed over which vegetables to be peeled are advanced from the feed hopper to the discharge chute of the machine.

The stud shafts 22, as will be seen from Figs. 2 and 4, extend a considerable distance beyond the side wall 12 exterior of the treating compartment 15 and are provided with V-belt pulleys 26 keyed thereto.

The V-belt pulleys 26 are arranged in groups of two spaced at staggered distances from the side wall 12 and positioned in such a manner as to align with V-belt pulleys 27 and 28, respectively, keyed to stud shafts 29 rotatably supported within sleeve bearings 30 attached to the side walls 12 of the upper frame structure. The various groups of pulleys 26 and their corresponding pulleys 27 or 28 are operatively interconnected by means of V-belts 31 and 32, respectively, as clearly shown in Figs. 1 and 2. Keyed to the shafts 29 are further pulleys 33 operatively interconnected and aligned with drive pulleys 34 and 36, respectively, fixed to a drive shaft 37 of a motor 38 by means of V-shaped drive belts 39 and 40 in a manner as clearly illustrated in Figs. 1 and 2. It will therefore be seen that upon operation of the motor 38 the peeling rolls 20 will be rotated in a common direction and at the same speed of rotation.

Positioned within the treating compartment 15 of the upper frame structure 2 and pivotally mounted between the side walls 11 and 12 thereof above the spacer members 25 and 25a are transversely extending partitions or deflectors 41, 42, 43, and 44. The partition 41 is positioned within the upper frame structure of the machine adjacent the feed hopper 17, while the partitions 42 to 44 inclusive are arranged within the treating compartment 15, driving the same into a plurality of guide channels or treating sections 46, 47, 48, and 49.

The partition 43, a detailed view of which is shown in Fig. 5, consists of vertical apron portions 50 and 51, provided with a supporting rod 52 and a sleeve portion 53, respectively. The sleeve portion 53, within which the rod 52 is received, is slidable relative to the latter and is further rotatably and slidably mounted within a bearing 54 on the side wall 11. The end 55 of the rod 52 extends through a bearing 56 on the side wall 12 and is provided with an actuating arm 57 fixed thereto. The sleeve portion 53 includes further a downwardly extending portion 58, so that in the assembly of the parts, as shown in Fig. 5, the apron portion 51 and the downwardly extending portion 58 receive the apron 50 therebetween, so that they may be swung back and forth together by mechanism hereinafter to be described.

The apron 50 of the partition 43 extends from the side wall 12 toward the side wall 11, leaving a passage opening 59 adjacent the latter between the treating sections 47 and 48, which may be enlarged or reduced by shifting the sleeve 53 and the adjustable apron portion 51 of the partition 43 relative to the apron portion 59.

One of the partitions 42 and 44, which are both of the same construction, has been shown in Fig. 4. It will be noted that each one of these partitions is of a construction similar to that of the partition 43 previously referred to herein. However, in the case of the partition members 42 and 44 the position of the aprons 59a and 51a and the passage openings formed thereby is reversed with respect to the side walls 11 and 12 of the machine. All corresponding parts of Figs. 4 and 5 have been correspondingly designated and a detailed description of the partition units 42 and 44 is not deemed necessary in view of the specific description given in regard to the partition unit 43 hereinbefore.

It will therefore be seen from the above that the apron members 50a of the partitions 42 and 44 extend from the side wall 11 toward the side wall 12, providing passage openings 60 and 61, respectively, which establish communication between the secitons 46 and 47 and sections 48 and 49 in a manner as shown in Fig. 2. The passage openings 60 and 61 may be likewise reduced or enlarged by shifting the aprons 51a relative to their cooperating apron members 50a. The free ends of the supporting rods 52a of the partitions 42 and 44 extend through bearings 62 attached to the side walls 12 and carry actuating arms 63 fixed thereto.

The partition 41 adjacent the end wall 13, as best seen in Fig. 7, consists of a single apron 64, pivotally supported within bearings 65 and 66 by means of a supporting rod 67, which extends through the bearing 66 and carries an actuating arm 68 fixed thereto. The apron 64 terminates short of the side wall 11 to provide a passage opening 69 aligned with the inlet opening 16 of the machine for admitting vegetables from the feed hopper 17 into section 46. From the above it will therefore be seen that the passage openings of the various partitions described herein provide a tortuous path for the vegetables passing through the machine.

All of the sleeve portions of the partitions 42 to 44 inclusive extend through their cooperating bearings 54 exterior of the side wall 11 a sufficient distance to permit shifting of the aprons 51 and 51a to their maximum open position and are provided with knobs 70 to permit manipulation thereof.

The actuating arms 57, 63, and 68 are pivotally connected to a connecting bar 71, and pivotally secured to the latter and arm 68 at 72 is an eccentric arm 73 operated by an eccentric 74, which forms a part of a gear 75 rotatably supported upon a shaft 76 attached to the side wall 12 of the upper frame structure of the machine. This gear 75 intermeshes with a drive gear 77 fixed to the left hand shaft 29, as shown in Fig. 1.

It will therefore be seen that when the motor 38 is operated to cause rotation of the peeling elements 20, gear 77 will be rotated to effect operation of the eccentric 74, causing reciprocation of the eccentric arm 73 and connecting bar 71. The reciprocating movement of the connecting bar 71, which is connected by means of the actuating arms 68, 63, and 57 to the partitions 41 to 44 inclusive causes a swinging movement of the partitions around the longitudinal axes of their supporting rods 67, 52a, and 52, respectively, from center to center of their adjacent peeling rolls.

Vegetables such as potatoes, beets, carrots or the like, continuously supplied to the feed hopper 17, are discharged therefrom into the section 46 and are crowded in oppositely transverse directions through the treating compartment 15 of the machine. In other words, the vegetables admitted to section 46 are crowded toward the passage opening 60 thereof and through the same enter the treating section 47 of the machine within which they are directed toward the passage opening 59, and through the latter into the treating section 48. From section 48 the vegetables travel through the passage opening 61 into section 49 from which they are finally discharged through the opening 19 upon the chute 18 and delivered from the machine. The vegetables advance therefore in opposite directions through alternate treating sections of the machine, whereby the vegetables continuously entering the machine crowd those within the treating sections through the same and outwardly of the machine. During the travel of the comestibles in this manner through the various treating sections, and while the peeling elements 20, which are provided with an abrasive surface, are rotated, the mass of the vegetables in each treating section is revolved and agitated so that the individual components thereof are presented to the action of the peeling rolls, and their skin or epidermis is removed thereby. The agitation and the rotation of the mass above referred to is primarily due to the combined action of the rolls 20 and the partitions adjacent the same, which are swung back and forth during the operation of the machine.

To explain this operation more specifically, reference is made to Fig. 9 wherein a single treating section has been diagrammatically illustrated, together with a mass of vegetables positioned therein between adjacent partitions 42 and 43. From this illustration it will be noted that while the partition 42 moves from its full line to its dotted line position as shown at 80 during the continuous rotation of the peeling elements 20 in a clockwise direction, the partition 43 will simultaneously move from its full line position to its dotted line position, as shown at 81, so that, due to the swinging action of the partitions 42 and 43 and the rotation of the peeling elements 20 the mass of vegetables will be shifted in the direction of the arrow 82 transversely of the peeling elements. Upon the return movement of the partitions 42 and 43 from their positions as shown at 80 and 81 to positions as indicated at 83 and 84, and due to the action of the peeling elements 20, the vegetables adjacent the partition 43 will be forced upwardly while the vegetables adjacent the partition 42 will tumble downwardly into the free space provided by the return of the partition 42 to its position as shown at 83. Therefore, a rotation or churning action will be imparted to the mass of vegetables in the direction of the arrows 85 as shown in Fig. 9. This agitation of the mass of vegetables will present the components thereof to the action of the peeling elements. Furthermore, the individual vegetables in frictional contact with the peeling elements 20 will be rotated thereby on their own axes and all of their skin portions will be presented to the abrading action of the peeling elements.

The rotation and agitation of the vegetables referred to herein in connection with Fig. 9 take place in each one of the sections 46—49 of the treating compartment 15. In addition to this action and depending upon the amount of crowding of the vegetables, as well as the angle of repose of various comestibles of the nature referred to herein, the vegetables will be advanced in a direction of the longitudinal axes of the peeling elements, until they arrive adjacent one of the passages 60, 59, and 61, whereupon they will be transferred from one treating section to another by the action of the peeling elements 20 imparting a forward movement to the same.

Due to the action of the swinging partitions or guide walls 41 to 44 inclusive, the vegetables are agitated sufficiently so as to prevent excessive peeling of the same, which would damage these comestibles and render them unfit for commercial purposes.

While the feeding of the vegetables in transverse directions through the treating compartment 15 is primarily produced by crowding the same from the charge end toward the discharge end of the machine, it should be noted that the swinging partitions promote such travel materially.

By varying the inclination of the peeling and vegetable supporting elements 20 upon adjustment of nuts 6 and 10, the speed of travel of the vegetables through the machine and the peeling action upon the same by the peeling elements 20 are regulated. However, the speed of the vegetables may be further controlled by varying the size of the passage openings 59, 60 and 61 between the various treating sections and will be effected by variations in the amount of vegetables supplied to the feed hopper 17.

A hopper 86 mounted within the lower frame structure 2 and below the peeling rolls 20 of the machine is provided for collecting the refuse from the treating compartment to facilitate the disposal thereof.

While I have described a particular embodiment of the present invention, it is to be understood that I do not wish to be limited to the specific structure of the same, as many changes may be made within the purview of the appended claims.

Having thus described my invention and in what manner the same may be used, what I claim as new and desire to protect by Letters Patent is:

1. In a vegetable peeling machine a longitudinally extending treating compartment, a series of peeling elements within the treating compartment positioned adjacent each other forming a continuous treating bed for supporting vegetables thereon, means for supplying vegetables to the peeling elements within said compartment, discharge means on said treating compartment for discharging vegetables therefrom, means for rotating the peeling elements in a common direction for advancing a mass of vegetables from the supply means to said discharge means and for rotating the component parts of said mass in frictional contact with said peeling elements, a plurality of adjustable partitions pivotally mounted within the treating compartment above the peeling elements in close proximity to the same and extending in a direction of the longitudinal axes of the peeling elements transversely of said treating compartment for changing the direction of travel of the vegetables therethrough, means for swinging the partitions transversely with respect to said peeling elements for effecting rotation of the mass of vegetables traveling between said partitions and for promoting the advancement thereof parallel to said peeling elements, and means for adjusting the transverse extension of the partitions with respect to the treating compartment for controlling the advancement of the vegetables through the same.

2. In a vegetable peeling machine a series of rotatable peeling elements positioned adjacent each other in an inclined plane forming a treating bed for supporting vegetables thereon, means for rotating the peeling elements in a common direction for directing the vegetables supported thereby in said direction, partition means extending transversely of the treating bed and parallel to the axes of the peeling elements for changing the direction of the vegetables over said treating bed, means for moving said movable means transversely of the peeling elements for promoting travel of the vegetables parallel to the peeling elements, and means for adjusting the extent of transverse extension of said partition means relative to said treating bed for controlling the advancement of the vegetables supported thereon.

3. In a vegetable peeling machine a series of rotatable peeling elements positioned adjacent each other in an inclined plane forming an inclined treating bed for supporting vegetables thereon, means for rotating the peeling elements in a common direction for advancing a mass of vegetables supported thereby in said direction, movable deflectors mounted above said bed and extending parallel to the axes of rotation of the peeling elements for changing the direction of travel of the mass of vegetables over said treating bed, means for vibrating said movable deflectors for agitating the mass of vegetables advancing over said treating bed, and means for adjusting the inclination of the treating bed for controlling the advancement of the mass of vegetables relative thereto.

4. In a vegetable peeling machine, a treating compartment comprising side and end walls and a series of closely spaced peeling rolls extending between the side walls of said compartment, a plurality of adjustable partition members between said side walls and closely spaced above said rolls for dividing the treating compartment into a plurality of sections, said partition members including a stationary and a movable apron, means for shifting the movable apron relative to said stationary apron for establishing communication between adjacent sections of the treating compartment, means for rotating said rolls for advancing a mass of vegetables supported thereon through said compartment, and means for oscillating said partition members transversely with respect to said rolls for agitating the mass of vegetables between said partitions to thereby present the component parts thereof to the action of the peeling rolls.

5. In a vegetable peeling machine, a treating compartment comprising side and end walls and a series of closely spaced peeling rolls extending between the side walls of said compartment in an inclined plane forming a continuous treating bed for supporting vegetables thereon, a plurality of adjustable partition members between said side walls and closely spaced above said rolls for dividing the treating compartment into a plurality of sections, said partition members including a stationary and a movable apron, means for shifting the movable apron relative to said stationary apron for establishing communication between adjacent sections of the treating compartments, means for rotating said rolls for advancing a mass of vegetables supported thereon through said compartment, means for oscillating said partition members transversely with respect to said rolls for agitating the mass of vegetables between said partitions to thereby present the component parts thereof to the action of the peeling rolls, and means for adjusting the inclination of said treating bed for controlling the advancement of the vegetables through said compartment.

6. In a vegetable peeling machine, an inclined treating bed comprising a series of closely spaced parallel peeling rolls, means for supplying a continuous stream of vegetables to said treating bed, discharge means associated with the treating bed, means for rotating said rolls in a common direction for advancing the vegetables over the treating bed, guide walls associated with said treating bed for directing the vegetables in a tortuous path over the same from the supply means to said discharge means, means for moving said guide walls back and forth transversely of said rolls for agitating the vegetables therebetween and for promoting the advancement thereof over said bed, and means for adjusting the inclination of the treating bed for controlling the rate of travel of the vegetables over the same.

7. In a vegetable peeling machine, a plurality of rotatable peeling elements positioned adjacent each other in vegetable supporting relation forming an inclined continuous treating bed, means for rotating the peeling elements in a common direction for directing a mass of vegetables supported thereby in said direction, deflector means mounted above said bed and extending parallel to the axes of rotation of the peeling elements for changing the direction of travel of the mass of vegetables over said treating bed, means for supplying a continuous mass of vegetables to said treating elements for crowding the vegetables over said treating bed, means for moving said deflector means back and forth over the peeling elements for agitating the mass of vegetables to promote the presentation of their component parts to the action of the peeling elements, and means for adjusting the inclination of the treating bed for controlling the rate of travel of the vegetables over said peeling elements.

8. A vegetable peeling machine comprising a treating compartment, a series of peeling rolls within the treating compartment positioned side by side in vegetable supporting relation forming a continuous gradually inclined treating bed, means for rotating said rolls in a common direction for directing a mass of vegetables supported thereon over said treating bed and through said compartment, a plurality of partitions movably mounted above said rolls in spaced relation for dividing the treating compartment in a plurality of sections in communication with each other and for directing the mass of vegetables in a tortuous path over said treating bed, means for swinging the partitions back and forth transversely of the peeling rolls for agitating the mass of vegetables passing through said sections to thereby present the component parts of said mass to the action of the peeling rolls and for promoting the travel of the mass of vegetables through said sections, and means for adjusting the inclination of said treating bed for controlling the rate of travel of the vegetables through said treating compartment.

9. A vegetable peeling machine comprising a treating compartment, a series of closely spaced parallel peeling rolls within said compartment forming a continuous treating bed for supporting vegetables thereon, vegetable supply and discharge means associated with the treating compartment, means for rotating the peeling rolls in a common direction for advancing a mass of vegetables from the supply to the discharge means transversely over said rolls and for rotating the component parts of said mass in frictional contact therewith, a plurality of spaced adjustable partitions extending alternately from opposite sides of said compartment over the treating bed dividing the treating compartment into a plurality of communicating sections for directing the mass of vegetables in a tortuous path over said treating bed, means for swinging the partitions back and forth transversely of the peeling rolls for agitating the mass of vegetables between adjacent partitions to thereby present the component parts of said mass to the action of the peeling rolls, and means for adjusting the extension of said partitions over the treating bed for controlling the advancement of the mass of vegetables through the treating compartment.

10. A vegetable peeling machine comprising a treating compartment, a series of closely spaced parallel peeling rolls arranged in an inclined plane and extending transversely within said compartment forming a continuous treating bed for supporting vegetables thereon, a feed hopper associated with said treating compartment for supplying vegetables to the same, a discharge chute for discharging the vegetables from said compartment, means for rotating said peeling rolls in a common direction for advancing a mass of vegetables from the feed hopper to the discharge chute transversely over said rolls and for rotating the component parts of said mass in frictional contact with the rolls, a plurality of spaced parallel partition members above said treating bed extending alternately from opposite sides thereof transversely over the same for dividing the treating compartment into a plurality of communicating treating sections and for directing the mass of vegetables in a tortuous path through said treating compartment, means for oscillating the partitions relative to the peeling rolls for causing rotation of the mass of vegetables within the treating sections incident to the travel of the vegetables therethrough to thereby present the component parts of said mass to the action of the peeling rolls, and means for varying the inclination of the treating bed for controlling the rate of travel of the mass of vegetables over the peeling rolls.

11. In a vegetable peeling machine a treating bed comprising a plurality of parallel rotary peeling elements extending transversely of said bed, means for rotating the peeling elements in a common direction for advancing vegetables supported thereby over said bed, side walls extending longitudinally of said bed for maintaining the vegetables thereon, deflector means mounted above said bed and extending parallel to the axes of said peeling elements for arresting the travel of the vegetables transversely over said peeling elements and cooperating with said side walls for directing the vegetables in a tortuous path over said bed, and drive means for moving said deflector means back and forth over said treating bed for agitating the vegetables thereon to promote their tortuous travel over said bed and to facilitate their presentation to the peeling elements.

12. In a vegetable peeling machine a treating bed comprising a plurality of parallel rotary peeling elements extending transversely of the bed, means for rotating the peeling elements in a common direction for advancing vegetables supported thereby transversely over the peeling elements, side walls extending longitudinally of said bed for maintaining the vegetables thereon, a plurality of spaced individually pivoted movable deflectors mounted above said bed and extending parallel to the axes of said peeling elements for arresting the travel of the vegetables transversely over said peeling elements and cooperating with the side walls for directing the vegetables in a tortuous path over said bed, and drive means for swinging said movable deflectors back and forth about their individual pivots transversely of the peeling elements for agitating the vegetables between said deflectors to promote their tortuous travel over said bed and to facilitate their presentaiton to the peeling elements.

13. In a vegetable peeling machine, a treating compartment, a treating bed therein comprising a plurality of closely spaced parallel peeling rolls extending transversely of said compartment, means for rotating said rolls in a common direction for advancing vegetables over said treating bed, a plurality of partitions, means mounting said partitions above said rolls for movement about individual axes, said partitions being formed to divide the treating compartment into a plurality of guide channels in staggered communication with each other defining a tortuous path for directing the vegetables over the treating bed, and drive means for positively swinging the partitions back and forth over the peeling rolls about their individual axes, for agitating the vegetables passing through said channels to facilitate their presentation to the peeling rolls and for promoting the tortuous travel of the vegetables through said guide channels.

14. In a vegetable peeling machine, a treating bed comprising a plurality of parallel peeling rolls extending transversely of said bed, means for rotating the rolls in a common direction for advancing vegetables supported thereby transversely over said rolls, a plurality of spaced movable deflectors individually pivoted above said bed and extending parallel to the axes of said peeling rolls for arresting the transverse travel of the vegetables over the rolls and for changing the direction of travel of the vegetables over the treating bed, drive means for positively moving said deflectors about their individual pivots back and forth over said treating bed for promoting the tortuous travel of the vegetables parallel to the peeling rolls and for agitating the vegetables between said deflectors to facilitate their presentation to the peeling rolls.

15. In a vegetable peeling machine a treating bed comprising a plurality of parallel peeling rolls, means for rotating the rolls in a common direction for advancing vegetables supported thereby transversely over the rolls, side walls extending longitudinally of said bed for maintaining the vegetables on the rolls, partitions parallel to and above said rolls for arresting the movement of the vegetables transversely over the rolls and for diverting the travel of the vegetables in a direction parallel to the axes of said rolls, said partitions being staggered with respect to each other between the side walls forming therewith a tortuous path for the vegetables passing over said rolls, and drive means for moving said partitions back and forth over the rolls to agitate the vegetables to promote their tortuous travel over said bed and to facilitate their presentation to the rolls.

16. In a vegetable peeling machine of the type embodying a treating bed comprising a plurality of parallel rotary peeling rolls extending transversely of the bed and a plurality of treating chambers above the rolls separated by intermediate partitions extending transversely of the treating bed, said partitions being formed to provide staggered vegetable conducting openings between the chambers whereby the vegetables are required to travel in opposite directions through adjacent chambers in order to pass through them over said bed, the combination of: means mounting said partitions for swinging movement about individual axes extending transversely of said treating bed, and a power drive for positively swinging said partitions back and forth about their pivotal axes to agitate the vegetables in said compartment thereby to promote their tortuous travel through said compartment and facilitate their presentation to said rolls.

NEAL S. SELLS.